(12) United States Patent
Daoud (10) Patent No.: US 6,973,249 B2
(45) Date of Patent: Dec. 6, 2005

(54) OPTICAL FIBER TROUGH FOR AN OPTICAL INTERCONNECTION SYSTEM

(75) Inventor: Bassel H. Daoud, Parsippany, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 39 days.

(21) Appl. No.: 10/448,543

(22) Filed: May 30, 2003

(65) Prior Publication Data

US 2004/0240823 A1    Dec. 2, 2004

(51) Int. Cl.[7] ................................................ G02B 6/00
(52) U.S. Cl. .................... 385/134; 385/135; 385/137
(58) Field of Search ................................ 385/134–138, 385/147

(56) References Cited

U.S. PATENT DOCUMENTS

| | | | |
|---|---|---|---|
| 6,321,017 B1 * | 11/2001 | Janus et al. | 385/134 |
| 6,362,422 B1 * | 3/2002 | Vavrik et al. | 174/50 |
| 6,597,854 B2 * | 7/2003 | Haataja et al. | 385/136 |
| 6,668,123 B1 * | 12/2003 | Ellison et al. | 385/134 |

* cited by examiner

*Primary Examiner*—Juliana Kang (57) ABSTRACT

An optical fiber trough includes a base member having a plurality of latches adapted to secure the optical fiber trough to an optical fiber closure. A retention member extends from the base member. The retention member includes a proximate edge supported by the base member and a distal edge. At least a portion of the distal edge is angled with respect to a plane of the base member.

20 Claims, 6 Drawing Sheets

OPTICAL FIBER TROUGH FOR AN OPTICAL INTERCONNECTION SYSTEM

BACKGROUND OF THE INVENTION

1. Field of the Invention

The present invention generally relates to optical fiber closures and, more particularly, to an optical fiber trough for optical fiber closure systems.

2. Description of the Related Art

Optical communications refer to the medium and the technology associated with the transmission of information as light pulses. Many applications utilize an optical fiber network to establish optical communications between network locations. In order to enable optical communication and the flow of optical signals between network locations, various interconnections must be established between different optical fibers. Such interconnections are typically established using an array of optical fiber closures disposed within a frame. Each of the optical fiber closures houses optical fiber connectors. Optical fiber jumper cables are used to connect fibers in one optical fiber closure to fibers in another optical fiber closure. Such optical fiber jumper cables are typically located external to the optical fiber closures.

Notably, optical fiber jumper cables exit an optical fiber closure and are passed through a trough system for retaining the optical fiber jumper cables before the cables enter another optical fiber closure. Present troughs are mounted to the frame supporting the optical fiber closures and include a plastic retainer cap to retain the optical jumper cables within the trough. Such troughs must be mounted to the frame before the initial installation of optical jumper cables, since mounting fasteners that hold the trough to the frame cannot be reached once the optical jumpers are in place. Also, if the trough requires replacement, the mounting fasteners are not easily accessible once the optical jumper cables are in place. Furthermore, since the present troughs are connected to the frame supporting the optical fiber closures, there is a clearance gap between the trough and the fiber closure, which may result in excessive bending of the optical jumper cables during installation or tracing procedures. Finally, the plastic retainer cap, while meant to retain the optical jumper cables, also complicates the insertion of the optical jumper cables during installation.

SUMMARY OF THE INVENTION

These and other deficiencies of the prior art are addressed by the present invention of an optical fiber trough for an optical fiber closure system. In one embodiment, an optical fiber trough comprises a base member having a plurality of latches adapted to secure the optical fiber trough to an optical fiber closure. A retention member extends from the base member. The retention member includes a proximate edge supported by the base member and a distal edge. At least a portion of the distal edge is angled with respect to a plane of the base member.

In another embodiment, an optical interconnection device comprises a housing having opposing side walls. At least one optical fiber trough is secured to a respective at least one of the opposing side walls. The at least one optical fiber trough comprises a base member and a retention member. The base member includes a plurality of latches adapted to secure the optical fiber trough to the housing. The retention member extends from the base member and includes a proximate edge and a distal edge. The proximate edge is supported by the base member, and at least a portion of the distal edge is angled with respect to a plane of the base member.

In yet another embodiment, an optical interconnection system comprises a first housing having a first side wall and a second housing having a second side wall. The first housing is spaced apart from the second housing such that the first wall is opposite the second wall. A first optical fiber trough is secured to the first side wall. The first optical fiber trough includes a first base member and a first retention member extending from the first base member. A second optical fiber trough is secured to the second side wall. The second optical fiber trough includes a second base member and a second retention member extending from the second base member. An outer edge of the first retention member and an outer edge of the second retention member define a gap, where at least a portion of the gap is angled with respect to a plane of the first base member and a plane of the second base member.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
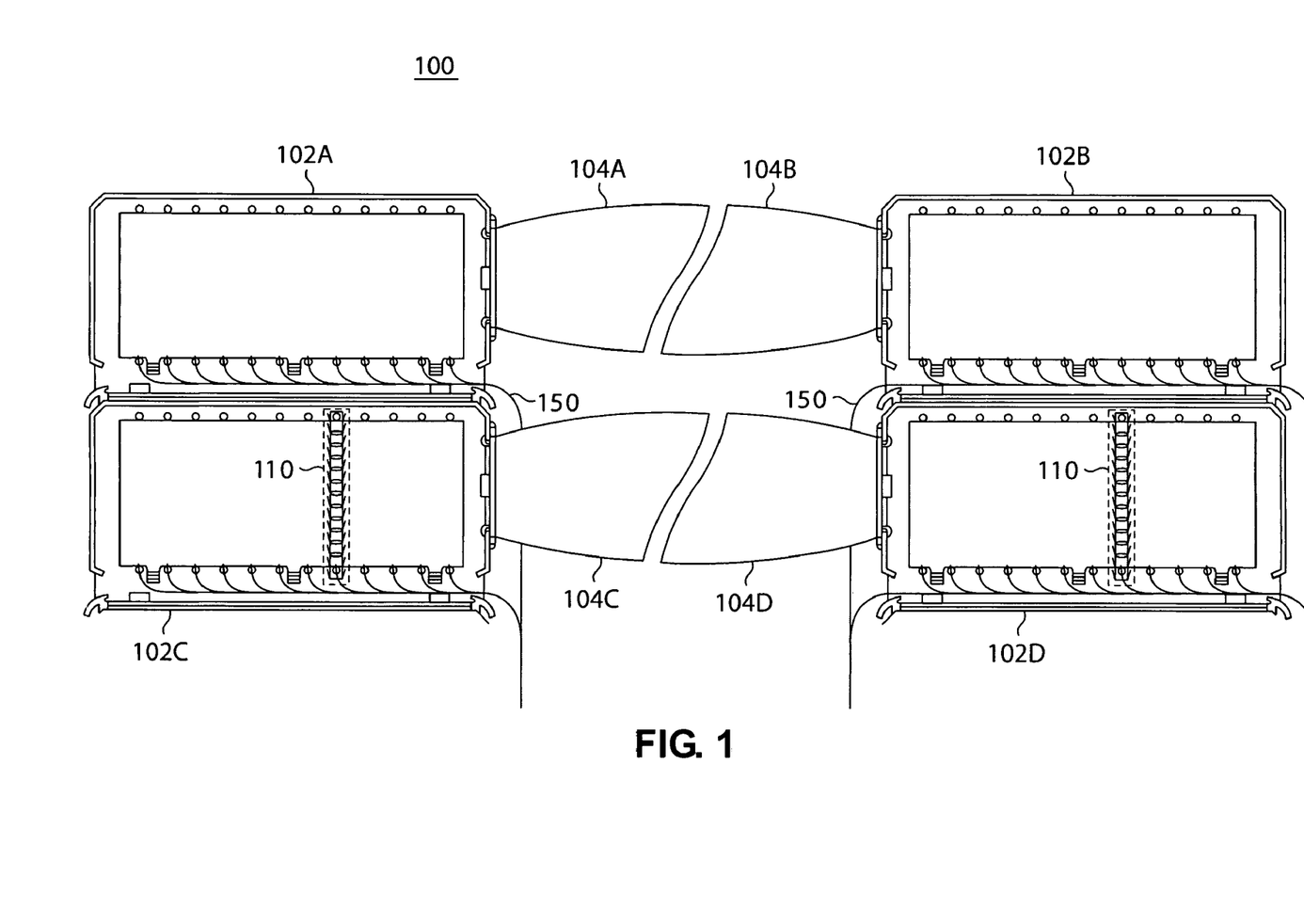
FIG. 1 is a front view of an exemplary embodiment of an optical interconnection system.

FIG. 1 is a front view of an exemplary embodiment of an optical interconnection system 100. The optical fiber interconnection system 100 comprises a plurality of optical fiber closures 102, for example, optical fiber closures 102A through 102D (generally referred to herein as optical fiber closures 102 or optical fiber closure 102). In this illustrative embodiment, fiber closures 102A and 102C are stacked in a first vertical column, and fiber closures 102B and 102D are stacked in a second vertical column. The two vertical columns formed by the fiber closures 102 are arranged side-by-side. The two-by-two arrangement of fiber closures 102 shown can be extended to a more general M-by-N arrangement of fiber closures 102 as required.

Each of the fiber closures 102A through 102D is illustratively shown as having a single optical fiber trough 104A through 104D, respectively (generally referred to herein as optical fiber troughs 104 or optical fiber trough 104). Those skilled in the art will appreciate that, depending upon the arrangement of optical fiber closures 102, a particular one of the optical fiber closures 102 can comprise an optical fiber trough 104 on each side. Each of the optical fiber closures 102 can support several optical connector panels 110 (e.g., two are shown). The optical fiber closures 102 allow for termination and interconnection of optical fibers via optical connector panels 110, and also provide for storage and retention of fiber slack via optical fiber troughs 104.

Optical fibers 150 exit the optical fiber closures 102 and are retained by optical fiber troughs 104. Each of the optical fiber troughs 104 are mounted directly to the optical fiber closures 102, rather than a frame supporting the optical fiber closures. This reduces or eliminates excessive bending among optical fibers 150 as the optical fibers 150 exit a fiber closure 202, as well as when the optical fibers 150 are being accessed (e.g., during a tracing operation).

Figure 2:
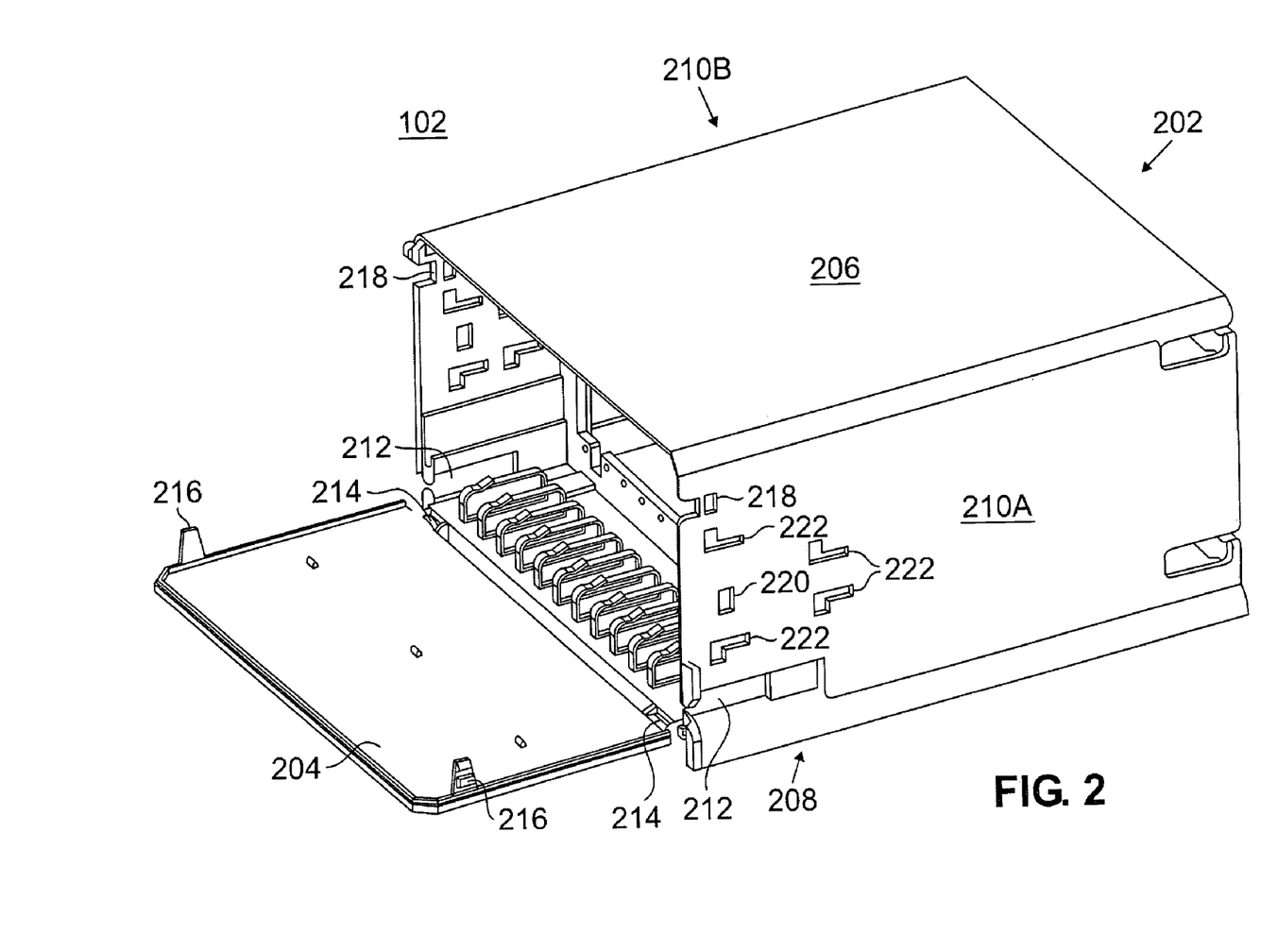
FIG. 2 is an isometric view depicting an exemplary embodiment of an optical fiber closure.

FIG. 2 is an isometric view depicting an exemplary embodiment of an optical fiber closure 102 without an optical fiber trough 104 attached thereto. The optical fiber closure 102 comprises a housing 202, a front cover 204, and a rear cover (not shown). The housing 202 may be constructed from sheet metal, plastic, or the like, and comprises a top 206, a bottom 208, and lateral opposing side panels 210A and 210B (collectively referred to as side panels 210). Each of the opposing side panels 210 includes an aperture 212 defined therein through which optical fibers can pass. The front cover 204 is pivotally attached to the housing 202 via hinges 214. The front cover 204 includes latch members 216 adapted to be inserted through slots 218 within side panels 210 for securing the front cover 204 to the housing 202 when the front cover 204 is in a closed position.

Figure 3:
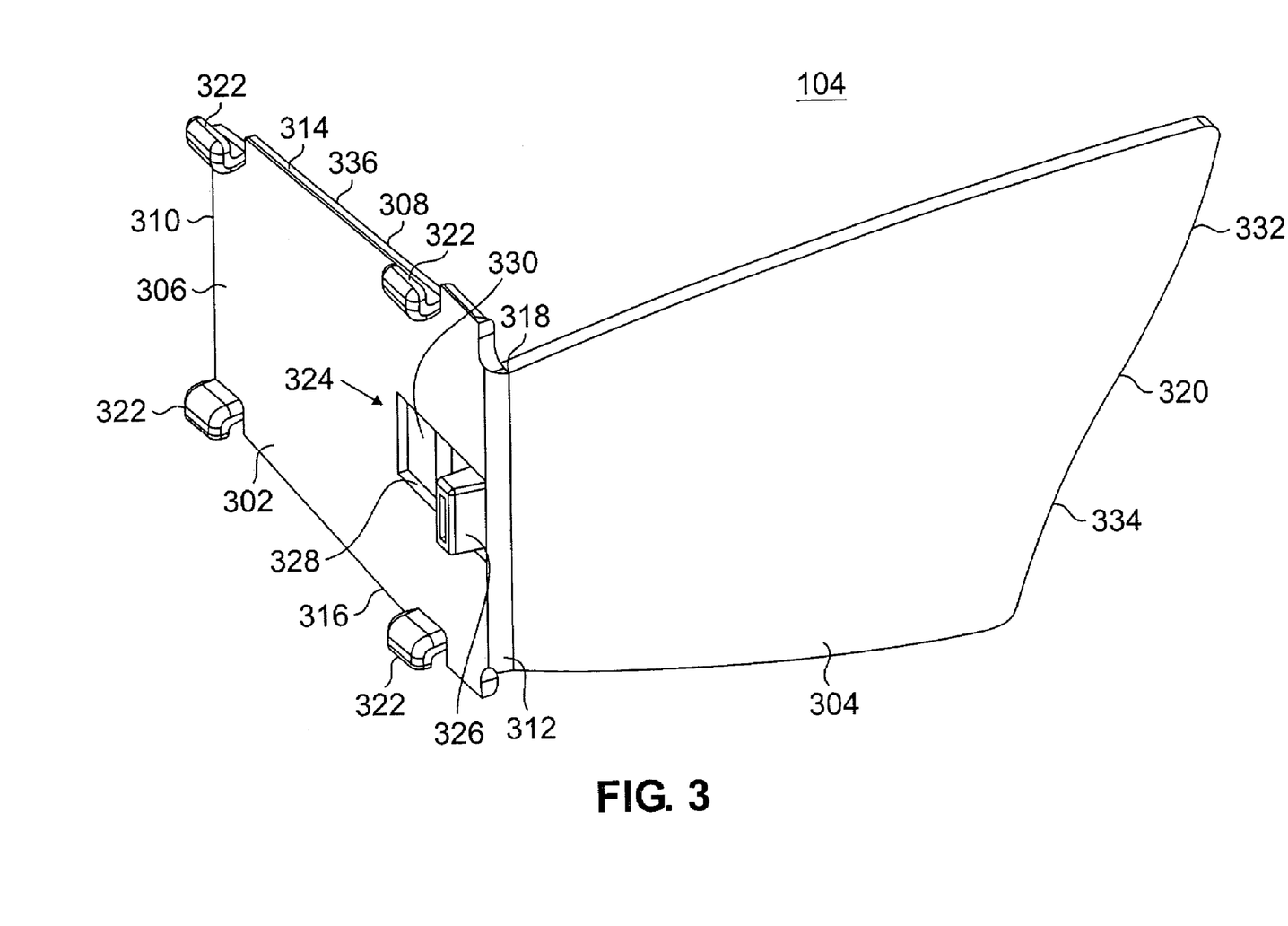
FIG. 3 is an isometric view depicting an exemplary embodiment of an optical fiber trough.
Figure 4:
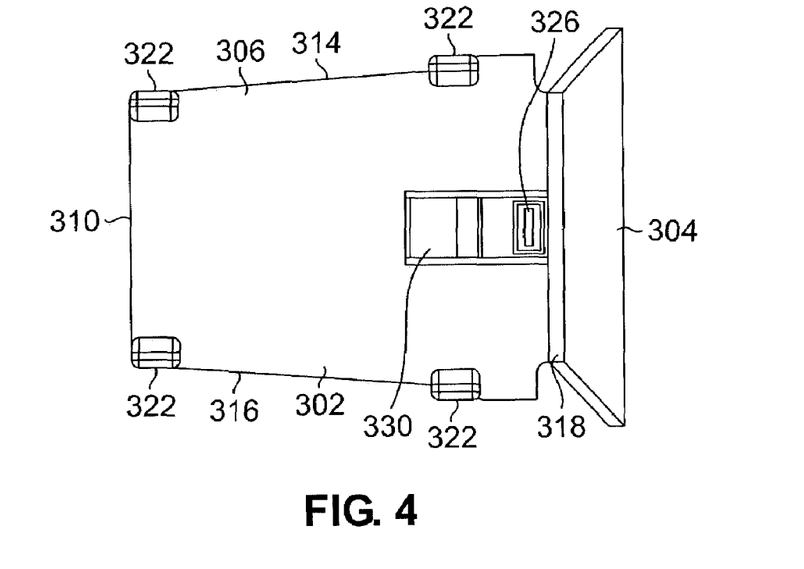
FIG. 4 is a side view of the optical fiber trough shown in FIG. 3.
Figure 5:
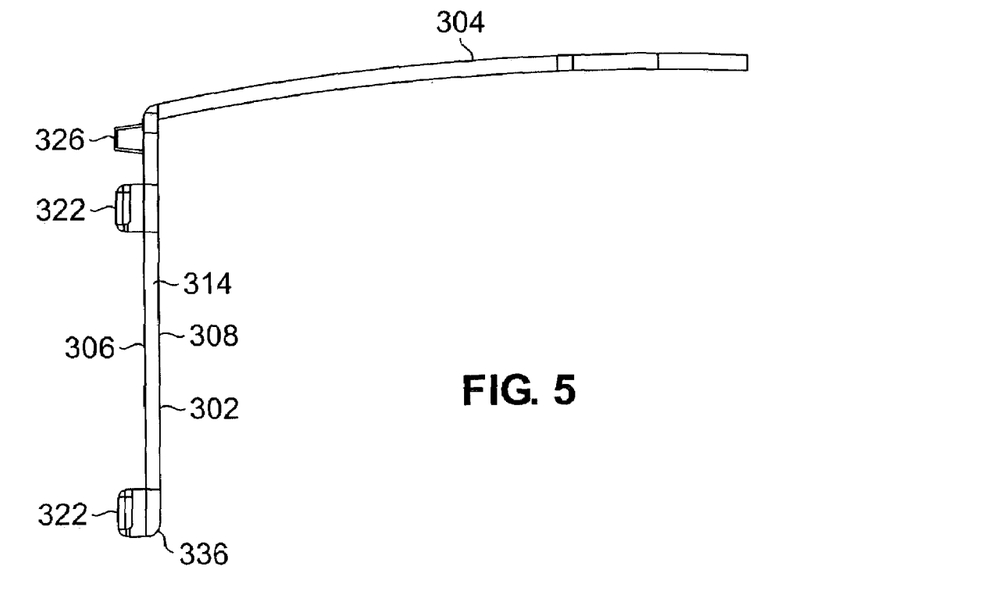
FIG. 5 is a top view of the optical fiber trough shown in FIG. 3.

The optical fiber trough 104 may be more thoroughly understood with simultaneous reference to FIGS. 3–5. FIG. 3 is an isometric view depicting an exemplary embodiment of an optical fiber trough 104. FIG. 4 is a side view of the optical fiber trough 104 shown in FIG. 3. FIG. 5 is a top view of the optical fiber trough 104 shown in FIG. 3. The optical fiber trough 104 may be formed of plastic and comprises a base member 302 and a retention member 304. In one embodiment, the base member 302 is generally trapezoidal in shape and includes an outer surface 306, and inner surface 308, a rear edge 310, a front edge 312, a top edge 314, and a bottom edge 316. The edges 310 through 316 of the base member 302 each have curved surfaces 336 with a radius of curvature greater than a predetermined minimum bend radius such that optical fibers traversing the curved surfaces 336 are not damaged.

The retention member 304 is also generally trapezoidal in shape and includes a proximate edge 318 and a distal edge 320. The proximate edge 318 is supported by the base member 302 proximate the front edge 312. In one embodiment, the retention member 304 is integral with the base member 302. Alternatively, the retention member 304 may be attached to the base member 302 using adhesive or other well-known mounting devices. In either case, at least a portion of the distal edge 320 is angled with respect to the plane of the base member 302. In one embodiment, the distal edge 320 includes a concave arcuate portion 334 and a complimentary convex arcuate portion 332. That is, the distal edge 320 is generally S-shaped. The radius of curvature of the concave and convex arcuate portions 334 and 332 is greater than a predetermined minimum bend radius of an optical fiber.

Returning to FIG. 1, the optical fiber troughs 104 may be configured to provide an angular gap therebetween such that optical fibers may be manually inserted or removed, but cannot otherwise escape. Notably, the optical fiber trough 104A may have a distal edge 320 that is complementary with a distal edge 320 of the optical fiber trough 104B. That is, the optical fiber troughs 104A and 104B may be positioned such that an S-shaped gap is formed therebetween. As the optical fibers 150 are vertically oriented behind the optical fiber troughs 104A and 104B, the optical fibers 150 cannot escape from behind the optical fiber troughs 104A and 104B without manual manipulation. The S-shaped distal edges of the optical fiber troughs obviate the need of an additional plastic retainer cap to retain the optical fibers.

Figure 7:
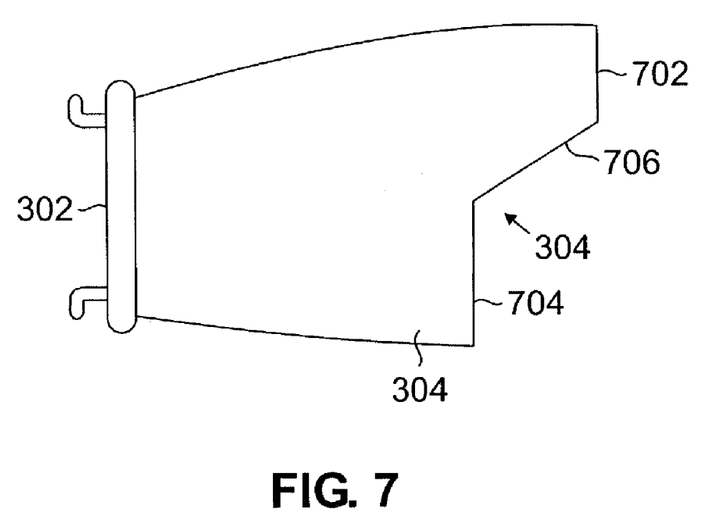
FIG. 7 is a front view depicting another exemplary embodiment of an optical fiber trough.
Figure 8:
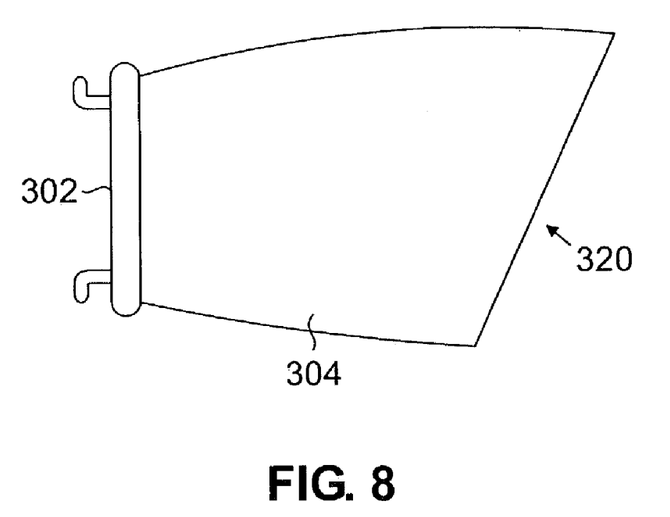
FIG. 8 is a front view depicting yet another embodiment of an optical fiber trough.

FIG. 7 is a front view depicting another exemplary embodiment of an optical fiber trough 104. In the present embodiment, the distal edge 320 of the optical fiber trough 104 comprises first and second portions 702 and 704 that are substantially parallel with the base member 302, and a third portion 706 that is angled with respect to the plane of the base member 302. That is, the distal edge 320 is generally Z-shaped. Optical fiber troughs having complementary Z-shaped edges may be configured in a side-by-side arrangement substantially as described above to retain optical fibers. FIG. 8 is a front view depicting yet another embodiment of an optical fiber trough 104. In the embodiment of FIG. 8, the distal edge 320 of the optical fiber trough 104 is substantially linearly tapered with respect to the plane of the base member 302. Optical fiber troughs having complementary tapered edges may be configured in a side-by-side arrangement substantially as described above to retain optical fibers. For purposes of clarity by example, optical fiber troughs having an S-shaped distal edge are shown in FIG. 1. It is to be understood, however, that the optical fiber troughs shown in FIGS. 7 and 8 may also be employed.

Returning to FIGS. 3–5, the base member 302 also includes a plurality of fixed latch members 322 (e.g., four are shown) and a flexible latch 324 disposed in an aperture 328. The fixed latch members 322 and the flexible latch 324 are adapted to secure the optical fiber trough 104 to an optical fiber closure. In one embodiment, the fixed latch members 322 are generally L-shaped and extend from the inner surface 306. For example, one pair of fixed latch members 322 may be disposed proximate the top edge 314 and another pair of fixed latch members 322 may be disposed proximate the bottom edge 316.

The flexible latch 324 is disposed proximate the front edge 312 within the aperture 328. The flexible latch 324 includes a flexible member 330 and a locking member 326. The flexible member 330 is cantilevered from the base member 302 within the aperture 328, and the locking member 326 extends substantially perpendicularly from an end of the flexible member 330. If a force is exerted on the locking member 326, the flexible member 330 flexes such that the locking member 326 moves towards the inner surface 306. Those skilled in the art will appreciate that other fixed/flexible latch configurations may be used to secure the optical fiber trough 104 to an optical fiber closure. In addition, those skilled in the art will appreciate that other types of fixed latch members and flexible latches that are known in the art may be used with the invention.

Returning to FIG. 2, each of the opposing side panels 210 includes an aperture 220 adapted to cooperate with the flexible latch 324 of the optical fiber trough 104, and a plurality of apertures 222 (e.g., four are shown) adapted to cooperate with the fixed latch members 322 of the optical fiber trough 104. Notably, the aperture 220 is generally rectangular in shape and is adapted to mate with the locking member 326 of the flexible latch 324. The apertures 222 are generally L-shaped and are adapted to mate with the L-shaped fixed latch members 322.

Figure 6:
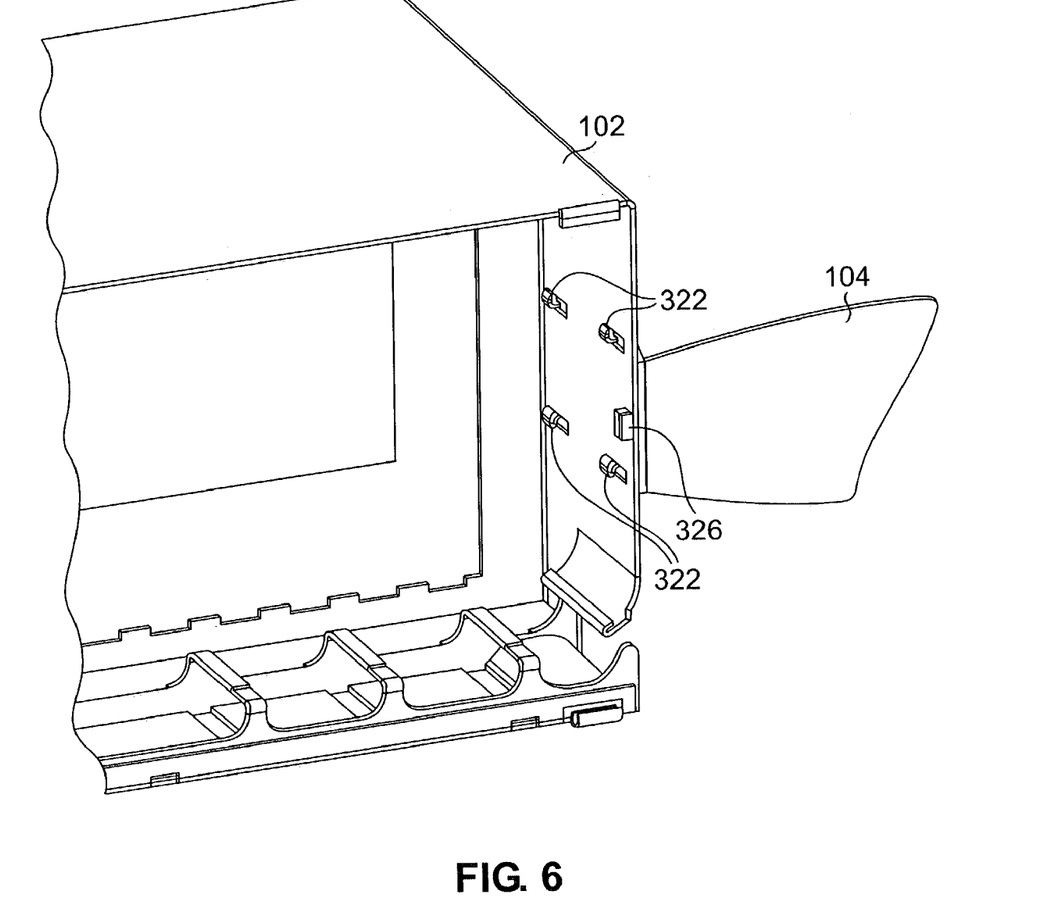
FIG. 6 is an isometric view depicting a portion of the optical fiber closure of FIG. 2 with the optical fiber trough of FIG. 3 attached thereto.

FIG. 6 is an isometric view depicting a portion of the optical fiber closure 102 with the optical fiber trough 104 attached thereto. To secure the optical fiber trough 104 to the optical fiber closure 102, the fixed latch members 322 are inserted through respective apertures 222. The flexible latch 324 will flex such that the locking member 326 is positioned proximate the inner surface 306. The optical fiber trough 104 may then be moved towards the rear of the optical fiber closure 102 until the locking member 326 is inserted through the aperture 220. In order to remove the optical fiber trough 104 from the optical fiber closure 102, the locking member 326 may be depressed and the optical fiber trough 104 may be moved towards the front of the optical fiber closure 102. As such, the optical fiber trough 104 may be removed from the optical fiber closure 102 by only manipulating the locking member 326 of the flexible latch 324. In this manner, a technician removing the optical fiber trough 104 does not have to access any fasteners disposed behind optical fibers being retained by the optical fiber trough. Thus, the risk of damage to optical fibers being retained by the optical fiber trough 104 is reduced or eliminated.

An optical fiber trough for an optical fiber interconnection system has been described. The optical fiber trough is mounted directly to an optical fiber closure, rather than a frame supporting the optical fiber closure, and may be removed by manipulating a single flexible latch disposed within the optical fiber closure. The optical fiber trough does not have to be installed during installation of optical fibers within the optical interconnection system. This facilitates and expedites the process of installing and connecting the optical fibers within the system. In addition, damaged optical fiber troughs may be replaced with minimal or no disturbance to the optical fibers, since the optical fibers do not have to be moved in order to remove the optical fiber trough.

While the foregoing is directed to the preferred embodiment of the present invention, other and further embodiments of the invention may be devised without departing from the basic scope thereof, and the scope thereof is determined by the claims that follow.

What is claimed is:

1. An optical fiber trough, comprising:
   a base member having inner and outer surfaces and a plurality of latches adapted to secure the optical fiber trough to an optical fiber closure; and
   a retention member extending from the base member, the retention member having a proximate edge supported by the base member and a distal edge, at least a portion of the distal edge being angled with respect to a plane of the inner and outer surfaces of the base member.

2. The optical fiber trough of claim 1, wherein the plurality of latches comprises a flexible latch and a plurality of fixed latches.

3. The optical fiber trough of claim 2, wherein the base member comprises an inner surface, an outer surface, a front edge, a rear edge, a top edge, and a bottom edge, and wherein the proximate edge of the retention member is proximate the front edge, the flexible latch is disposed on the inner surface proximate the front edge, a first pair of the plurality of fixed latches is disposed on the inner surface proximate the top edge, and a second pair of the plurality of fixed latches is disposed on the inner surface proximate the bottom edge.

4. The optical fiber trough of claim 1, wherein the retention member is integral with the base member.

5. The optical fiber trough of claim 1, wherein the distal edge comprises a concave arcuate portion and a convex arcuate portion.

6. The optical fiber trough of claim 1, wherein the distal edge comprises first and second portions substantially parallel with the base member and a third portion angled with respect to the plane of the base member.

7. The optical fiber trough of claim 1, wherein the distal edge is substantially linearly tapered with respect to the plane of the base member.

8. An optical interconnection device, comprising:
   a housing having opposing side walls; and
   at least one optical fiber trough secured to a respective at least one of the opposing side walls, the at least one optical fiber trough comprising:
      a base member having inner and outer surfaces and a plurality of latches adapted to secure the optical fiber trough to the housing; and
      a retention member extending from the base member, the retention member having a proximate edge supported by the base member and a distal edge, at least a portion of the distal edge being angled with respect to a plane of the inner and outer surfaces of the base member.

9. The optical interconnection device of claim 8, wherein the plurality of latches comprises a flexible latch and a plurality of fixed latches and the at least one of the opposing side walls comprises a first aperture adapted to cooperate with the flexible latch and a plurality of second apertures adapted to respectively cooperate with the plurality of fixed latches.

10. The optical interconnection device of claim 9, wherein the base member comprises an inner surface, an outer surface, a front edge, a rear edge, a top edge, and a bottom edge, and wherein the proximate edge of the retention member is proximate the front edge, the flexible latch is disposed on the inner surface proximate the front edge, a first pair of the plurality of fixed latches is disposed on the inner surface proximate the top edge, and a second pair of the plurality of fixed latches is disposed on the inner surface proximate the bottom edge.

11. The optical fiber trough of claim 8, wherein the distal edge comprises a concave arcuate portion and a convex arcuate portion.

12. The optical fiber trough of claim 8, wherein the distal edge comprises first and second portions substantially parallel with the base member and a third portion angled with respect to the plane of the base member.

13. The optical fiber trough of claim 8, wherein the distal edge is substantially linearly tapered with respect to the plane of the base member.

14. An optical interconnection system, comprising:
   a first housing having a first side wall and a second housing having a second side wall, the first housing spaced apart from the second housing such that the first wall is opposite the second wall;
   a first optical fiber trough secured to the first side wall, the first optical fiber trough comprising a first base member and a first retention member extending from the base member, the first retention member having an outer edge; and a second optical fiber trough secured to the second side wall, the second optical fiber trough comprising a second base member and a second retention member extending from the second base member, the second retention member having an outer edge;

where the outer edge of the first retention member and the outer edge of the second retention member define a gap, at least a portion of the gap being angled with respect to a plane of the first base member and a plane of the second base member.

15. The optical interconnection system of claim 14, wherein the outer edge of the first retention member and the outer edge of the second retention member define an S-shaped gap.

16. The optical interconnection system of claim 14, wherein the outer edge of the first retention member and the outer edge of the second retention member define the gap such that first and second portions of the gap are substantially parallel with the plane of the first base member and the plane of the second base member and a third portion of the gap is angled with respect to the plane of the first base member and the plane of the second base member.

17. The optical interconnection system of claim 14, wherein each of the first base member and the second base member comprises a flexible latch and a plurality of fixed latches.

18. The optical interconnection system of claim 17, wherein the first retention member comprises an inner edge supported by the first base member and the second retention member comprises an inner edge supported by the second base member.

19. The optical interconnection device of claim 18, wherein each of the first and second base members include an inner surface, an outer surface, a front edge, a rear edge, a top edge, and a bottom edge, and wherein the inner edge of each of the first and second retention members is proximate the front edge of the respective first and second base members.

20. The optical interconnection device of claim 19, wherein the flexible latch of each of the first and second base members is disposed on the inner surface proximate the front edge thereof, a first pair of the plurality of flexible latches of each of the first and second base members is disposed on the inner surface thereof proximate the top edge thereof, and a second pair of the plurality of flexible latches of each of the first and second base members is disposed on the inner surface thereof proximate the bottom edge thereof.

* * * * *